United States Patent
Oki et al.

(10) Patent No.: US 7,974,098 B2
(45) Date of Patent: Jul. 5, 2011

(54) MECHANISM TO MAKE A HEAT SINK IN CONTACT WITH A PLUGGABLE TRANSCEIVER, A PLUGGABLE OPTICAL TRANSCEIVER AND A CAGE ASSEMBLY PROVIDING THE SAME

(75) Inventors: Kazushige Oki, Yokahama (JP); Hiromi Kurashima, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 73 days.

(21) Appl. No.: 12/332,199

(22) Filed: Dec. 10, 2008

(65) Prior Publication Data

US 2009/0296351 A1    Dec. 3, 2009

Related U.S. Application Data

(60) Provisional application No. 60/996,924, filed on Dec. 11, 2007.

(30) Foreign Application Priority Data

Dec. 21, 2007 (JP) ................................ 2007-329668

(51) Int. Cl.
  *H05K 7/20* (2006.01)
  *F28D 15/00* (2006.01)
  *G02B 6/36* (2006.01)

(52) U.S. Cl. ........ 361/715; 361/709; 361/710; 361/714; 361/719; 165/80.3; 165/185; 257/718; 257/719; 398/117; 398/164

(58) Field of Classification Search .................. 361/709, 361/710, 714, 715, 719; 385/92; 372/36; 353/57; 362/294, 345, 373, 580, 547, 218, 362/264; 398/117, 164; 165/80.3, 185; 257/718, 257/719

See application file for complete search history.

(56) References Cited

U.S. PATENT DOCUMENTS

| | | | |
|---|---|---|---|
| 6,600,611 B2 * | 7/2003 | Inujima et al. | 359/808 |
| 6,788,540 B2 | 9/2004 | Kruger et al. | |
| 6,893,293 B2 * | 5/2005 | Ice et al. | 439/607.2 |
| 6,916,122 B2 * | 7/2005 | Branch et al. | 385/92 |
| 6,922,516 B2 * | 7/2005 | Kurashima et al. | 385/134 |

(Continued)

FOREIGN PATENT DOCUMENTS

JP    2007-156461    6/2007

(Continued)

OTHER PUBLICATIONS

U.S. Appl. No. 12/332,173, filed Dec. 10, 2008.

*Primary Examiner* — Anatoly Vortman
(74) *Attorney, Agent, or Firm* — Venable LLP; Michael A. Sartori; Leigh D. Thelen (57) ABSTRACT

A heat-dissipating mechanism with a thermo-conducting sheet is arranged between a pluggable optical transceiver and a heat sink. One of the optical transceiver and the heat sink includes the thermo-conducting sheet. The heat sink is assembled with a cage to be movable vertically and against a downward force. The optical transceiver includes a projection that comes in contact with the heat sink. The heat sink includes a rail with a pocket. When the transceiver is inserted into the cage, the projection first runs along the rail to lift the heat sink upward; subsequently, the projection is set within the pocket to allow the thermo-conducting sheet to contact the transceiver.

16 Claims, 6 Drawing Sheets

U.S. PATENT DOCUMENTS

| | | | |
|---|---|---|---|
| 6,935,882 B2 * | 8/2005 | Hanley et al. | 439/372 |
| 7,048,452 B2 * | 5/2006 | Malagrino, Jr. | 385/92 |
| 7,131,859 B1 * | 11/2006 | Zumbrunnen et al. | 439/487 |
| 7,178,996 B2 * | 2/2007 | Malagrino et al. | 385/92 |
| 7,195,403 B2 * | 3/2007 | Oki et al. | 385/92 |
| 7,260,303 B2 | 8/2007 | Bench et al. | |
| 7,317,617 B2 * | 1/2008 | Meadowcroft et al. | 361/715 |
| 7,322,850 B2 * | 1/2008 | Neer et al. | 439/567 |
| 7,371,965 B2 * | 5/2008 | Ice | 174/50 |
| 7,457,126 B2 | 11/2008 | Ahrens | |
| 7,491,090 B2 * | 2/2009 | Oki et al. | 439/607.17 |
| 7,529,094 B2 | 5/2009 | Miller | |
| 7,530,835 B2 * | 5/2009 | Yu et al. | 439/372 |
| 7,764,504 B2 | 7/2010 | Phillips et al. | |
| 2003/0002824 A1 * | 1/2003 | Chan et al. | 385/92 |
| 2003/0141090 A1 * | 7/2003 | Kruger et al. | 174/50 |
| 2003/0161108 A1 | 8/2003 | Bright et al. | |
| 2003/0169983 A1 * | 9/2003 | Branch et al. | 385/92 |
| 2003/0236019 A1 * | 12/2003 | Hanley et al. | 439/372 |
| 2004/0027816 A1 * | 2/2004 | Ice | 361/797 |
| 2004/0101257 A1 * | 5/2004 | Kruger et al. | 385/92 |
| 2004/0203289 A1 * | 10/2004 | Ice et al. | 439/607 |
| 2005/0220425 A1 | 10/2005 | Kropp et al. | |
| 2005/0226571 A1 * | 10/2005 | Malagrino et al. | 385/92 |
| 2006/0176666 A1 | 8/2006 | Saturley et al. | |
| 2006/0270275 A1 * | 11/2006 | Morohashi et al. | 439/607 |
| 2006/0274518 A1 * | 12/2006 | Yu et al. | 361/816 |
| 2007/0134003 A1 * | 6/2007 | Lee et al. | 398/164 |
| 2008/0031620 A1 * | 2/2008 | Hudgins et al. | 398/9 |
| 2008/0247762 A1 * | 10/2008 | Yoshikawa et al. | 398/138 |
| 2009/0296351 A1 | 12/2009 | Oki et al. | |
| 2010/0067196 A1 | 3/2010 | Costello et al. | |

FOREIGN PATENT DOCUMENTS

| | | | |
|---|---|---|---|
| JP | 2010085805 A | * | 4/2010 |
| WO | WO 03060583 A1 | * | 7/2003 |

* cited by examiner

Prior Art

FIG. 6

MECHANISM TO MAKE A HEAT SINK IN CONTACT WITH A PLUGGABLE TRANSCEIVER, A PLUGGABLE OPTICAL TRANSCEIVER AND A CAGE ASSEMBLY PROVIDING THE SAME

CROSS REFERENCE TO RELATED APPLICATIONS

This application claims the benefit of U.S. provisional application No. 60/996,924, filed Dec. 11, 2007, which claims priority from Japanese application, JP2007-329668, filed on Dec. 21, 2007, which are both incorporated herein by reference in their entirety.

BACKGROUND OF THE INVENTION

1. Field of the Invention

The present invention relates to a mechanism to dissipate heat from a pluggable optical transceiver, in particular, the invention relates to a structure of a heat sink provided in a cage that receives the pluggable optical transceiver.

2. Related Prior Art

An optical transceiver transmits and receives optical signals through an optical connector engaged therewith by using optically active devices, such as a semiconductor light-emitting device and a semiconductor light-receiving device. An optical transceiver generally has a body that houses a plurality of electronic components, electronic circuits and circuit boards, and also includes an optical receptacle that receives the optical connector. A hot-pluggable optical transceiver is a type of optical transceiver. Such a transceiver is inserted into or extracted from a cage. The cage is arranged on a host board to engage an electrical plug of the transceiver with an optical connector located in the far end of the cage without the need to turn off the power of the host system.

Figure 6:
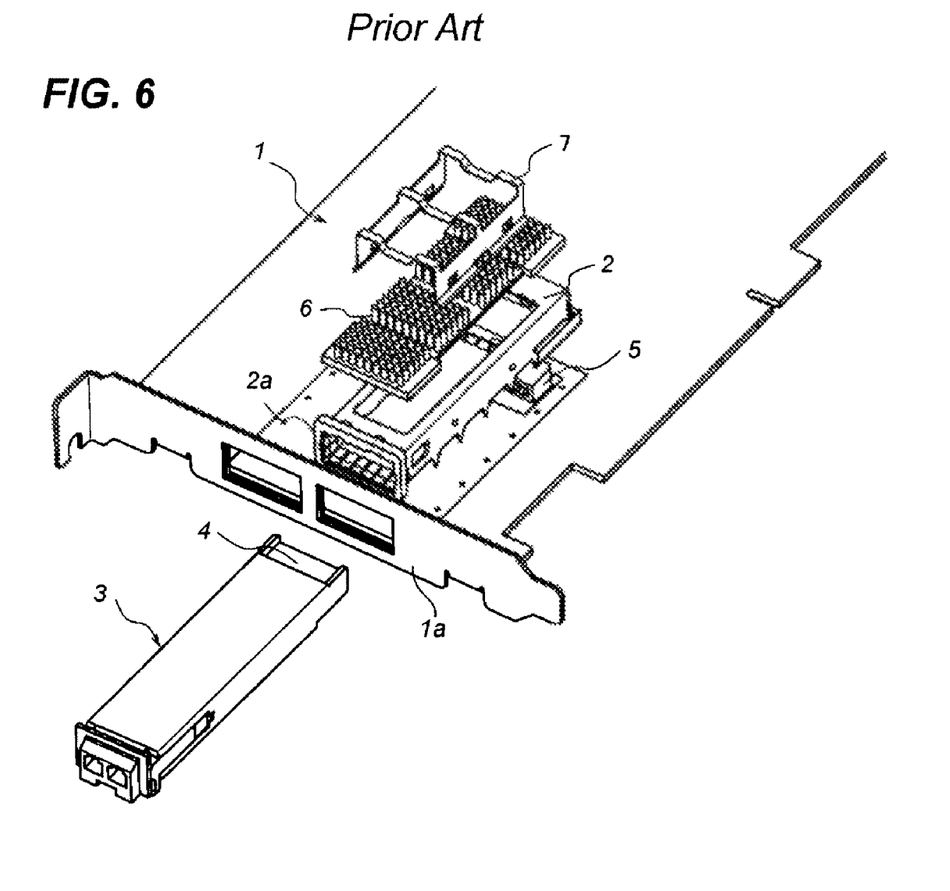
FIG. 6 is prior art and illustrates a pluggable transceiver and a cage assembled with a heat sink by a conventional structure.

FIG. 6 schematically illustrates one type of the pluggable transceiver called an XFP. FIG. 6 illustrates a state where the XFP transceiver 3 is to be installed within the host board 1. Japanese Patent Application published as JP-2007-156461A discloses an XFP transceiver 3. As illustrated in FIG. 6, the host board 1 includes a bezel 1a and a metal cage 2 that exposes an opening 2a at the front end thereof with respect to the bezel 1a of the host board 1. The XFP transceiver 3 is inserted into or extracted from the opening 2a. The rear end of the transceiver 3 includes an electrical plug 4. The transceiver 3 may electrically communicate with the host board 1 by engaging this plug 4 with an optical connector 5 provided in the far end of the cage 2.

The top of the cage 2 provides a heat sink 6 to dissipate heat from the transceiver 3 set in the cage 2. A clip 7 fastens the heat sink with the cage 2. The contact surfaces of the transceiver 3 and the heat sink 6, such as the roughness of the top surface of the transceiver 3 and that of the bottom surface of the heat sink 6, influence the heat-dissipating efficiency.

Recent transmission speeds in optical communication systems exceed 10 Gbps and sometimes reach 100 Gbps. Such speeds inevitably accompany greater power consumption in electronic and optical devices. An effective heat-dissipating mechanism is always required. To obtain efficient heat conduction between solids, such as the contact surfaces between a housing of the transceiver and a heat sink of the cage, it may be necessary to increase the contact area and to make the contact surfaces as smooth as possible. However, the process to obtain such smooth surfaces is cost-ineffective. Further, outer dimensions of the transceiver, which are primarily defined by acceptable standards, do not permit the contact area to be optionally increased.

Another known method of securing effective thermal contact between metals includes placing a viscous paste or a resin sheet with less hardness between the contact surfaces. Although resin is inherently inferior in thermal conductivity, resin in a form of powder is applicable for merging metals or ceramics with good thermal conductivity by forming the resin in a thin sheet. Such thermo-conducting sheet merges metals or ceramics with good thermal conductivity. Such a thermo-conducting sheet, is applicable as a gap-filler. The thermo-conducting sheet may be placed between contact surfaces of two members rigidly fixed with respect to each other. The thermo-conducting sheet may remove air gaps and equivalently increase the contact area between the members. Accordingly, the thermo-conducting sheet may secure efficient heat transmission between members. However, it is insufficient for effective heat transmission to merely set the thermo-conducting sheet between the members. Additional actions in applying adequate pressure to the members is necessary for effective heat transmission.

In a conventional pluggable optical transceiver, heat-dissipation occurs only by the physical contact between the housing of the transceiver and the heat sink without any thermo-conducting sheet. In other cases where the heat generation in the transceiver is comparably less, the housing of the transceiver itself may perform the heat-dissipating function without coming in contact with the heat sink. However, recent pluggable optical transceivers increasingly generate more heat as the transmission speeds increase and the transmission distance increases. The increases in speed and distance inevitably require heat sinks and an effective heat-dissipating path from the transceiver to the heat sink.

As discussed, the pluggable optical transceiver, as its name indicates, is inserted into or extracted from the cage. Therefore, an arrangement that does not interfere with the insertion or the extraction of the transceiver is necessary for the thermal contact between the housing of the transceiver and the heat sink. When the transceiver is inserted into the cage, the heat sink provided in the cage must be apart from the housing until the transceiver is set in the intended position to secure smooth insertion. Embodiments of the present invention provide such a mechanism between the housing of the transceiver and the heat sink.

SUMMARY OF THE INVENTION

One aspect of the present invention relates to a mechanism to dissipate heat from a pluggable optical transceiver set in a cage to a heat sink assembled with the cage. Such heat dissipation may be through a thermo-conducting sheet placed between the optical transceiver and the heat sink. The mechanism includes at least a projection in a rear end of the optical transceiver, at least a rail with a pocket provided in the heat sink, and a mechanism, provided in the cage and the heat sink, to cause a downward force on the heat sink. In the present embodiment, the projection first lifts the heat sink upward against the downward force by running along the rail when the transceiver is inserted into the cage. The projection is finally set within the pocket to cause a thermo-conducting sheet to come in contact with the optical transceiver when the optical transceiver is set in a final position within the cage.

The mechanism of the invention enables the thermo-conducting sheet to be apart from the surface of the transceiver until the optical transceiver is set in its final position. This may prevent the thermo-conducting sheet from being scraped by the transceiver and peeled off. Moreover, because the downward force caused in the heat sink occurs at the final position of the transceiver, the effective heat-dissipating path may be secured from the optical transceiver to the heat sink.

Another aspect of the present invention relates to a pluggable optical transceiver to be set in a cage that provides a heat sink to dissipate heat from the optical transceiver through a thermo-conducting sheet. The heat sink is applied with a downward force from the cage when the cage is free from the transceiver and includes a first rail with a first pocket and a second rail with a second pocket. The optical transceiver includes a first projection and a second projection with a surface to come in contact with the thermo-conducting sheet. The second projection is not overlapped with the first projection in a direction along which the optical transceiver is inserted into the cage. The first projection first runs on the first rail of the heat sink to lift the heat sink upward when the transceiver is inserted into the cage. The first projection is set within the first pocket and the second projection is set within the second pocket such that the heat sink comes in contact with a surface of the transceiver by putting the thermo-conducting sheet there between when the optical transceiver is set in an intended position within the cage.

A third aspect of the present invention relates to a cage assembly for a pluggable optical transceiver. The cage assembly includes a cage and a heat sink. The cage provides an aperture in a top thereof and an elastic member to causing a downward force on the heat sink. The heat sink is provided with a thermo-conducting sheet and is exposed in the cage by the aperture of the cage. The heat sink is movable within the aperture in vertical direction, while unable to move substantially in a horizontal direction. The heat sink also provides a rail with a pocket in a surface where the thermo-conducting sheet is attached thereto. In the cage assembly according to this embodiment, a projection provided in the optical transceiver runs along the rail to lift the heat sink upward against the downward force when the optical transceiver is inserted into the cage. The pocket receives the projection to cause the thermo-conducting sheet to contact the optical transceiver when the transceiver is set in the intended position within the cage.

BRIEF DESCRIPTION OF DRAWINGS

FIGS. 2A and 2B schematically show a side and plan view of the optical transceiver, respectively; while.

DESCRIPTION OF THE EMBODIMENTS

Figure 1A:
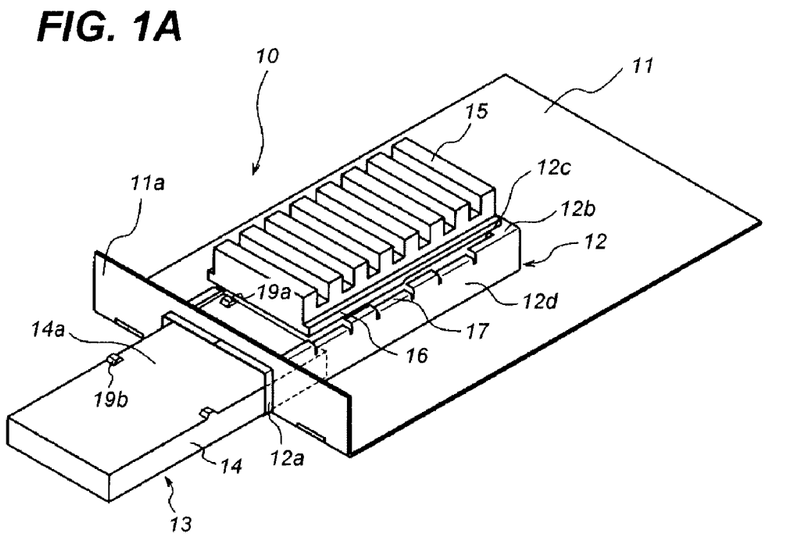
FIG. 1A is a perspective view schematically showing a heat-dissipating mechanism between the heat sink and the optical transceiver.
Figure 1B:
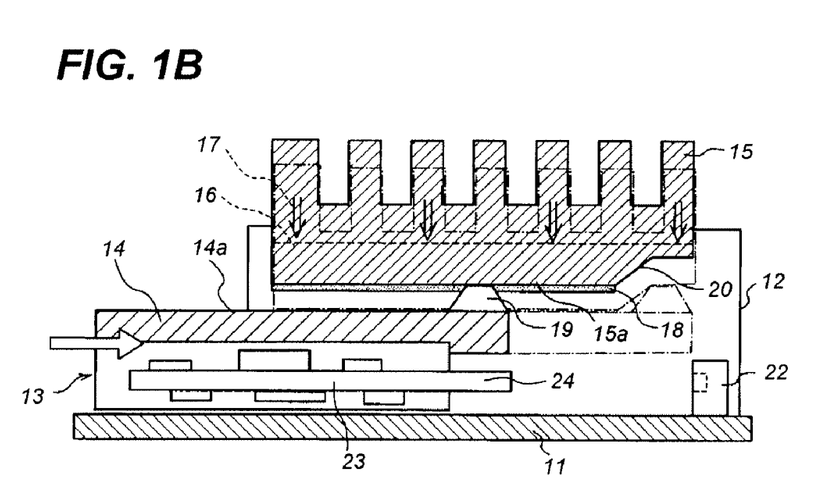
FIG. 1B is a cross section illustrating the movement of the transceiver and the heat sink according to an embodiment of the invention.

Next, embodiments according to the present invention are described in detail as referring to drawings. FIG. 1A is a perspective view schematically showing the heat-dissipating mechanism according to an embodiment of the invention, and FIG. 1B is a cross section of the heat-dissipating mechanism. The fundamental structure of the heat-dissipating mechanism is similar to conventional mechanisms such as those shown in FIG. 6. Referring to FIG. 1A, the host system 10 provides a host board 11 where a metal cage 12 is arranged thereon. A pluggable optical transceiver 13 is inserted into or extracted from the cage 12. The host system 10 includes a bezel 11a. The front end of the cage 12 provides an opening 12a that is exposed from the bezel 11a to receiver the transceiver 13.

The cage 12 has a box shape with an aperture 12c in the top 12b thereof to expose a heat sink 15. The heat sink 15 is assembled with the cage 12 such that the heat sink 15 is movable in up and down directions. The cross section of the side rib 16 controls the up and down motion of the heat sink 15, as depicted in FIG. 1B. The side rib 16 cooperates with tabs 17 formed in the side 12d of the cage 12.

The optical transceiver 13 has a metal housing 14. When the transceiver 13 is set within the cage 12, the top 14a of the housing 14 comes in thermal contact with the heat sink 15. FIG. 1B also illustrates an electrical plug 24 in the rear end of the transceiver 13. This plug 24 is mated with the connector 22 arranged in the far end of the cage 12 to secure the communication with the host system 10. Such communication may include supply of electric power from the host system to the transceiver 13 and transmission of electrical signals between the transceiver 13 and the host system 10.

FIG. 1B illustrates a thermo-conducting sheet 18 arranged between a bottom 15a of the heat sink 15 and the top 14a of the housing 14 to secure a heat conducting path from the transceiver 13 to the heat sink 15. In FIG. 1B, the heat sink 15 includes the thermo-conducting sheet 18. In order to maintain the effective thermal conduction from the housing 14 to the heat sink 15 so that the effectiveness is not deteriorated, the thermo-conducting sheet 18 should be adhered to both the top 14a of the housing 14 and the bottom 15a of the heat sink 15. The thermo-conducting sheet 18 may be made of softened material with good thermal conductivity.

Specifically, the thermo-conducting sheet 18 may be made of resin such as silicone rubber, or may be made of a hybridized material of organic and inorganic material. Such material may contain, as a thermal conductive filler, metal powder of copper, aluminum, silver or stainless steel; or minute particles of oxide metal such as of aluminum oxide, titanium oxide or silicon oxide, nitride metal such as boron nitride, aluminum nitride, or chromium nitride; or other carbonized metal. The thickness of the thermo-conducting sheet 18 may be approximately from 0.3 to 1.0 mm. Such a thermo-conducting sheet may be easily available in the market.

The optical transceiver 13, as already described, is a type of pluggable transceiver which is insertable into and extractable from the cage 12. The transceiver 13 should not scrape off or not peel off the thermo-conducting sheet 18 at the insertion or the extraction. The transceiver 13 according to the present embodiment includes the projection 19 at both sides of the top 14a of the housing 14 and the heat sink 15 includes a rail 20 at both sides of the bottom 15a thereof that receives the projection 19. Both the projection 19 and the rail 20 are formed in respective surfaces to interfere with the thermo-conducting sheet 18.

The elastic tab 17 applies a downward force to the heat sink 15. When the transceiver 13 is inserted into the cage 12, the projection 19 lifts up the heat sink 15 against the downward force, as the projection 19 abuts against the bottom 15a of the heat sink 15. That is, the thermo-conducting sheet 18 may be at a distance from the top 14a of the housing 14 without being in contact until the transceiver 13 is set in the final intended position in the cage 12.

At the final position of the transceiver 13 in the cage 12, the rail 20 receives the projection 19, at which the heat sink 15 is pressed downward by the elastic force caused by the side tab 17, as denoted by the dotted line position in FIG. 1B. Thus, the bottom 15a of the heat sink 15 is pressed against the top 14a of the housing. Accordingly, the thermo-conducting sheet 18 is arranged between the heat sink 15 and the housing 14. The mechanism described above may secure the effective heat-dissipating path from the transceiver 13 to the heat sink 15 without scraping or peeling off the thermo-conducting sheet 18 between the housing 14 and the heat sink 15.

Figure 2A:
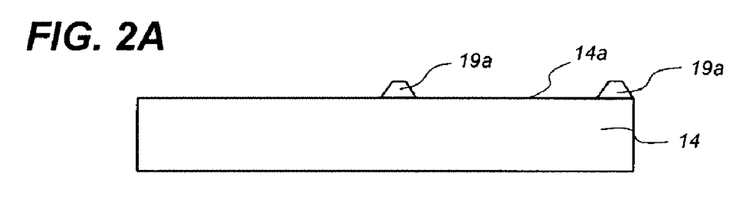
Figure 2B:
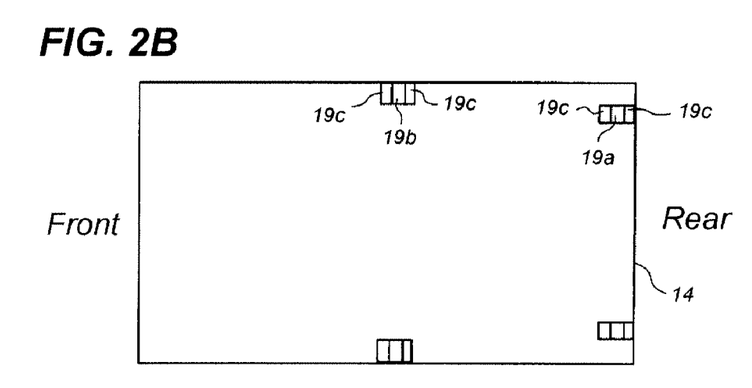
Figure 2C:
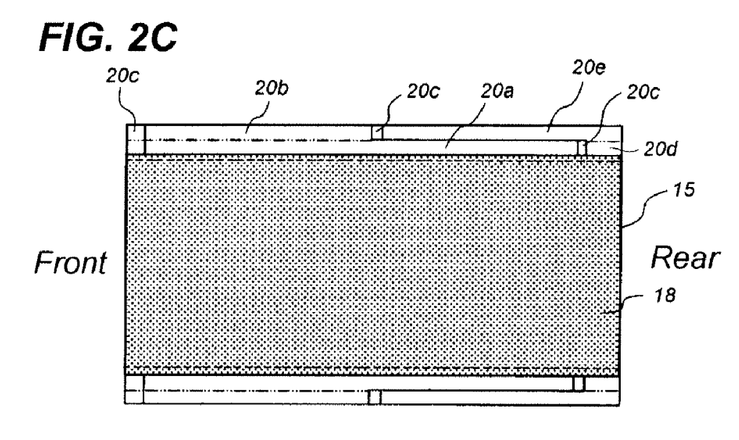
FIGS. 2C and 2D show a plan and side view of the heat sink according to an embodiment of the invention.
Figure 2D:
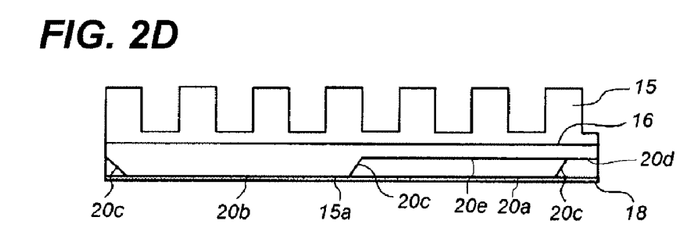

FIGS. 2A to 2D illustrate the projection 19 on the top 14a of the housing 14 and the rail 20 in the bottom 15a of the heat sink 15, respectively. FIGS. 2A and 2B are side and top views of the housing 14, respectively, while, FIGS. 2C and 2D are bottom and side views of the heat sink 15, respectively. The top 14a of the housing 14 includes two types of projections, 19a and 19b, each including front and rear slopes 19c. A distance between rear projections 19a is smaller than a distance between front projections 19b, as illustrated in FIG. 2B. That is, the rear projections 19a are positioned inwardly with respect to the front projection 19b, which are positioned outwardly with respect to a center longitudinal axis. The two projections, 19a and 19b, do not overlap with each other along the longitudinal direction of the transceiver 13. Moreover, the respective projections, 19a and 19b, have sloping sides in both longitudinal sides which facilitate the mating of the projections with the rail 20 of the heat sink 15.

The rail 20 on both, sides of the heat sink 15 provides two tracks, 20a and 20b. Each track receives a respective projection, 19a or 19b, of the housing 14. Here, only a center portion of the bottom 15a of the heat sink 15 includes the thermo-conducting sheet 18, and both side walls of the transceiver 13 include the side rib 16. The first inner track 20a receives the first projection 19a at the rear projection of the housing 14. The second outer track 20b, arranged outside of the first track 20a, receives the second projection 19b at the front projection. The rear end of the first track 20a includes the pocket 20d where the first projection 19a is set therein. The rear end of the second track 20b includes the second pocket 20e where the second projection 19b is set therein. The ends of respective tracks, 20a and 20b, provide a slope 20c to facilitate the slide of the projection, 19a or 19b, thereon.

FIGS. 3A to 3E schematically illustrate the mating mechanism between the projections, 19a and 19b, and the tracks, 20a and 20b. When the transceiver 13 is free from the cage 12, the heat sink 15 is pressed downward by the elastic tab 17 of the cage 12. Accordingly, it is necessary to lift the heat sink 15 upward against the downward force caused by the tab 17 when the transceiver 13 is inserted into the cage 12.

Figure 3A:
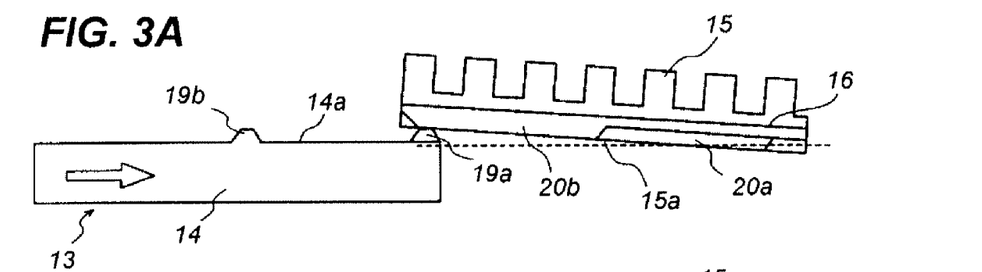
FIGS. 3A to 3E show positional relations between the transceiver and the heat sink when the transceiver is set in the cage.

At the initial position of the transceiver 13 in the cage 12, as shown in FIG. 3A, the first projection 19a slides on the slope 20c in the front end of the first track 20a and slips there under. Thus, the first projection 19a abuts against the bottom 15a of the heat sink 15 to lift the front end of the heat sink 15 upward. Because the front end of the heat sink 15 is lifted upward, the insertion of the transceiver 13 into the cage 12 may be facilitated.

Figure 3B:
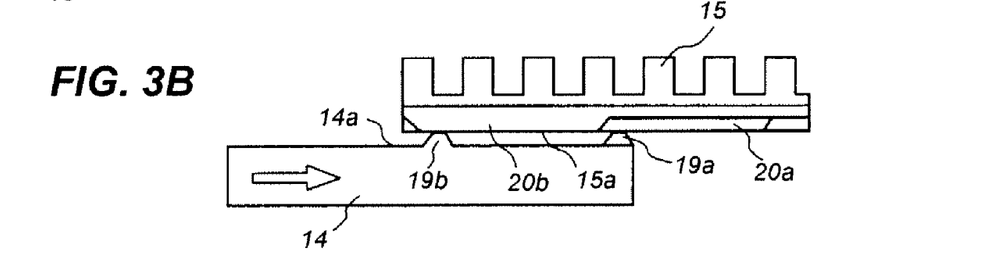

Subsequent to the initial position shown in FIG. 3A, the transceiver 13 is further pushed into the cage until the first projection 19a is in a midway in the cage 12 as shown in FIG. 3B. The other front projection 19b also comes in contact with the bottom 15a of the heat sink 15, which orients the heat sink 15 substantially horizontal.

Figure 3C:
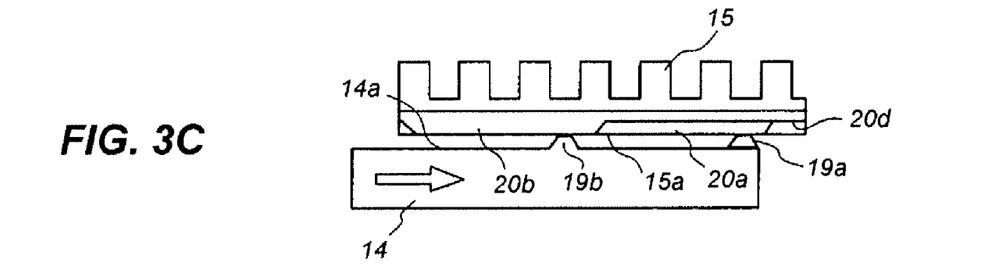

FIG. 3C illustrates a status where the transceiver 13 is set in a position just before the final position. In FIG. 3C, the two projections, 19a and 19b, still come in contact with the respective tracks, 20a and 20b, and are not yet set within the pockets, 20d and 20e. By pushing the transceiver 13 slightly into the cage 12 past the position shown in FIG. 3C, only the first projection 19a is set within the first pocket 20d of the first track 20a, while, the front projection 19b is still left on the second track 20b. This position orients the heat sink 15 as inclined with the front end of the heat sink 15 lifted up again against the downward force caused by the elastic tab 17.

At the final position of the transceiver 13 in the cage 12, the second and front projection 19b is also set into the second pocket 20e. At this position, the thermo-conducting sheet 18 between the housing 14 and the heat sink 15 is pressed by the downward force of the heat sink 15 by the elastic tab 17. When the transceiver 13 is extracted from the cage 12, the mechanism described above may also operate to extract the transceiver from the heat sink 15.

Figure 3D:
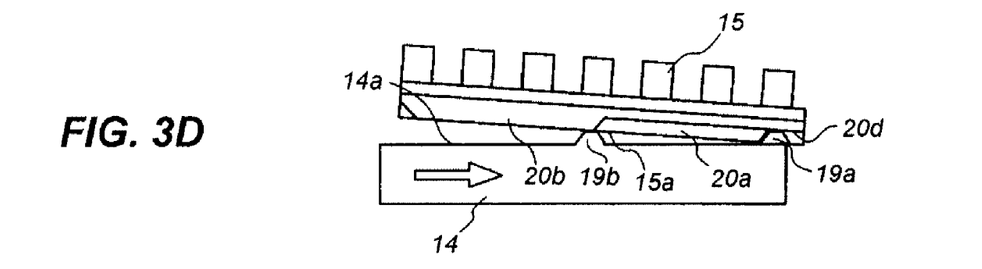
Figure 3E:
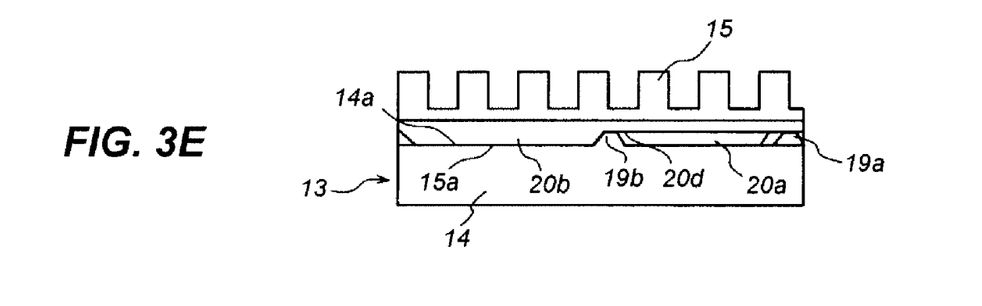

That is, the second front projection 19b is first set on the second track 20b to lift the front end of the heat sink 15 upward against the downward force of the tab 17, as shown in FIG. 3D. Next, the first projection 19a, in addition to the second front projection 19b, is set on the first track 20a, which levels the heat sink 15 as shown in FIG. 3C. Finally, only the first projection 19a is left in contact with the heat sink 15.

Thus, according to the embodiment described above, the transceiver 13 may be inserted into or extracted from the cage 12 without touching the top 14a of the housing 14 to the thermo-conducting sheet 18 until the transceiver 13 is set in the final portion in the cage 12. At the final portion, the plug 24 mates with the connector 22. The thermo-conducting sheet 18 may be prevented from being scraped or peeled off by the transceiver 13. Similarly, when the transceiver 13 is extracted from the cage 12, the mechanism according to an embodiment of the invention first separates the thermo-conducting sheet 18 from the housing 14, and second extracts the transceiver 12 from the cage 13.

Figures 4A, 4B, 4C:
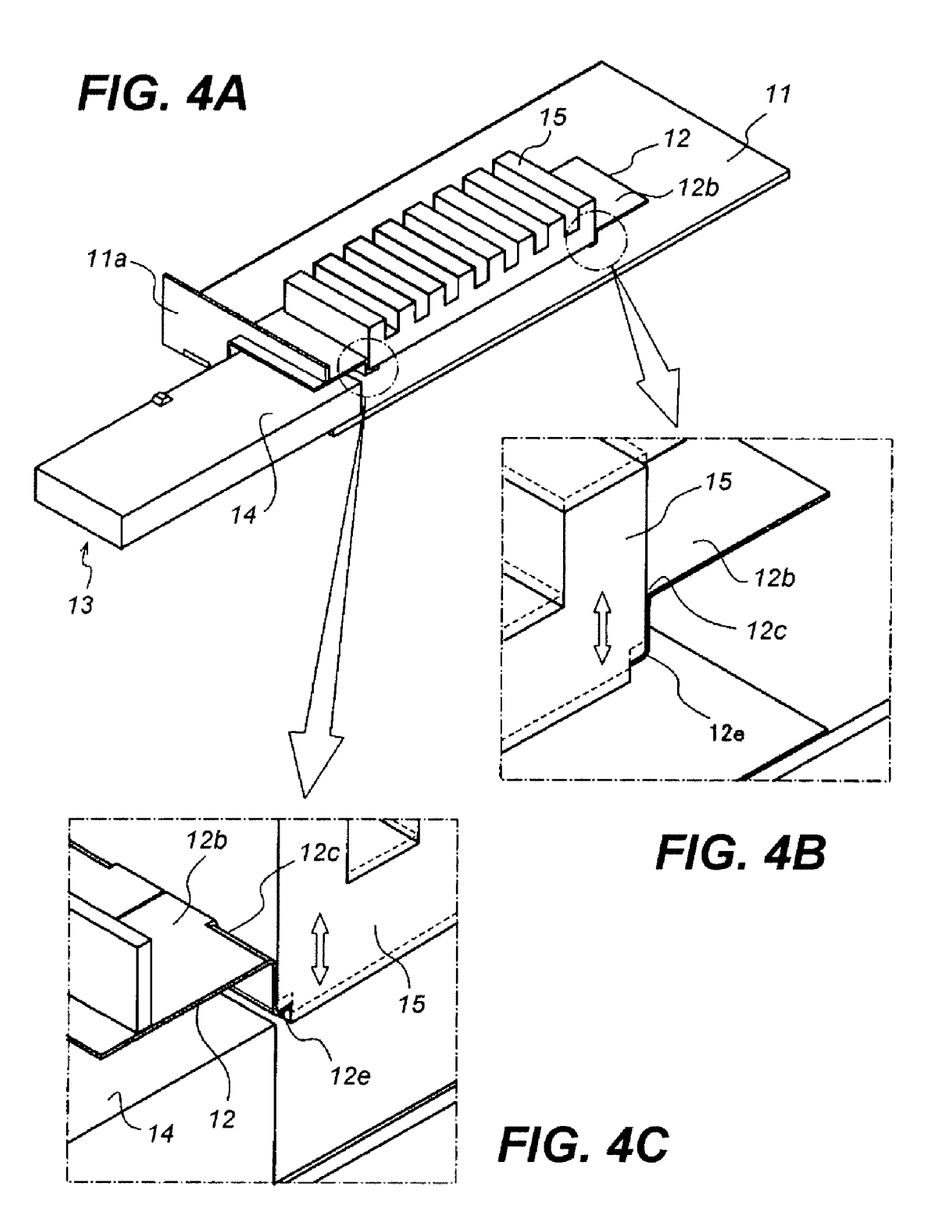
FIGS. 4A to 4C illustrate a structure of the heat sink and the cage to support the heat sink movable in vertical direction while substantially unable to move in horizontal direction.

FIGS. 4A to 4C, and FIGS. 5A and 5B illustrate an arrangement to assemble the heat sink 15 with the cage 12 which enables a downward force to be applied to the heat sink 15. FIGS. 4A to 4C are cross sections taken along the longitudinal direction of the transceiver 13.

As explained above, the heat sink 15 is assembled with the cage 12 such that the top of the heat sink 15 includes a plurality of fins exposed through the aperture 12c of the cage 12. The plurality of fins are vertically movable but substantially unable to move horizontally. The front and rear edges defining the aperture 12c are bent downward and a tip of the bent portion extends inside the aperture 12c to form a tip tab 12e. The bottom corners of the front and rear ends of the heat sink 15 include a step hooked on the tip tab 12e. When the cage 12 is free from the transceiver 13, the heat sink 15 receives the downward force of the tab 17 in the side of the cage 12. The downward force may be compensated by the tip tab 12e. When the cage 12 receives the transceiver 13, the heat sink 15 is lifted upward by the projections, 19a and 19b, of the top 14a of the housing 14, as illustrated in the position shown by the dotted lines in FIGS. 4B and 4C.

Figure 5A:
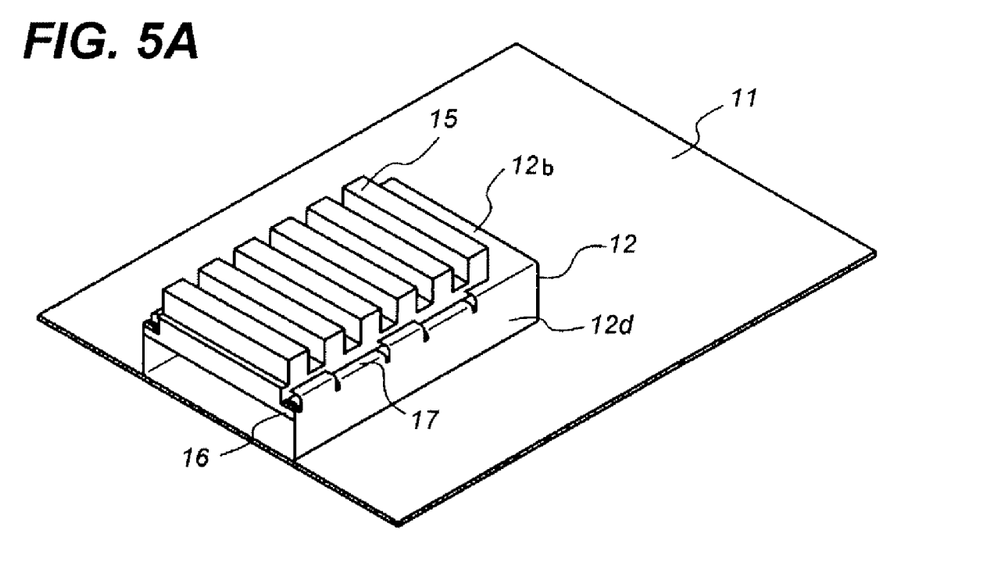
FIG. 5A schematically illustrates a structure of the cage to cause the downward force on the heat sink.
Figure 5B:
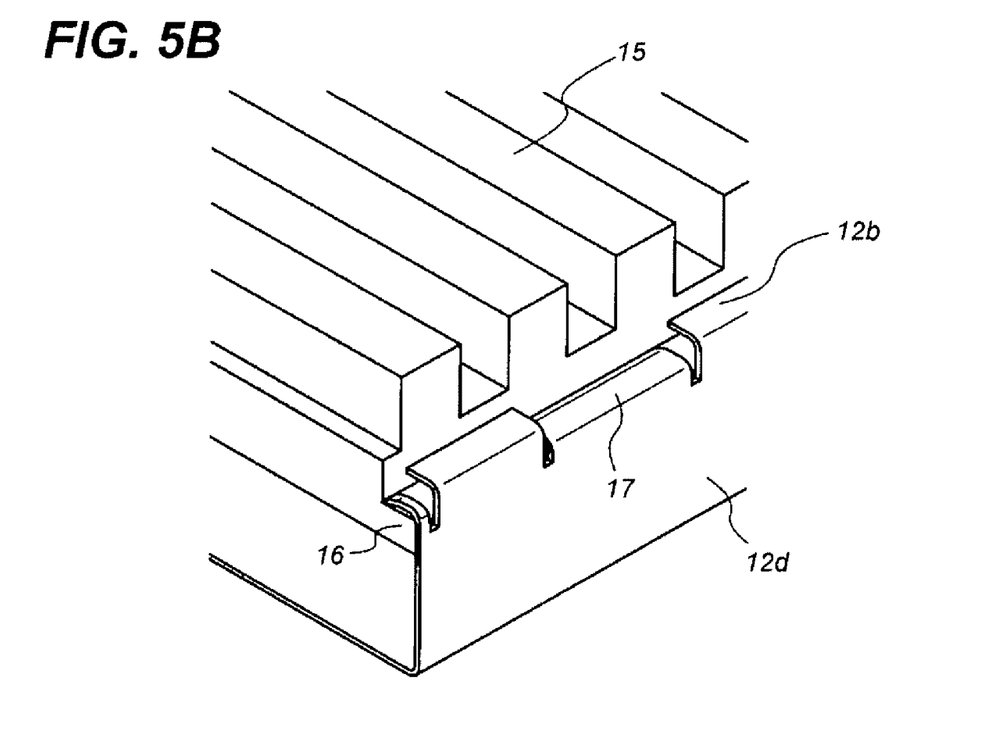
FIG. 5B is a magnified view of the structure shown in FIG. 5A.

FIGS. 5A and 5B show the side tab 17 of the cage 12 which causes the downward force on the heat sink 15. This side tab 17 is integrally formed with the cage 12 by cutting the cage 12 at several points in the sides defining the aperture 12c with a preset interval. The cut portions may be bent inward to form an arched cross section. The side rib 16 of the heat sink 15 in the upper surface thereof abuts against this arched side tab 17 which causes the downward force when the cage 12 is free from the transceiver 13. When the transceiver 13 is set within the cage 12, the heat sink 15 is lifted upward against the downward force applied to the upper surface of the side rib 16 by the arched tab 17.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A mechanism to dissipate heat from a pluggable optical transceiver set in a cage to a heat sink assembled with said cage through a thermo-conducting sheet put between said transceiver and said heat sink, said mechanism comprising:
    at least a projection provided in a rear end of said optical transceiver;
    at least a rail with a pocket provided in said heat sink; and
    a mechanism provided in said cage and said heat sink to cause a downward force to said heat sink,
    wherein said projection first lifts said heat sink upward against said downward force by running on said rail of said heat sink when said optical transceiver is inserted into said cage, and
    wherein said projection finally is set within said pocket of said heat sink to have said thermo-conducting sheet come in contact to said optical transceiver when said optical transceiver is set in a final position within said cage.

2. The mechanism according to claim 1,
    wherein said optical transceiver provides two projections apart from each other in a direction along which said optical transceiver is inserted into said cage and without overlapping along said direction, and
    wherein said heat sink provides two rails each having a pocket, one of said projections first running on one of said rails to lift said heat sink upward and another of said projections subsequently running on another of said rails to level said heat sink.

3. The mechanism according to claim 2,
    wherein said two projections are each set within said pocket provided in said respective rails when said optical transceiver is set in said final position within said cage.

4. The mechanism according to claim 1,
    wherein said projection is apart from said thermo-conducting sheet when said optical transceiver is set in said cage.

5. The mechanism according to claim 1,
    wherein said cage provides an aperture through which said heat sink is exposed within said cage,
    wherein said heat sink is vertically movable within said aperture, and substantially unable to move horizontally within said aperture.

6. The mechanism according to claim 5,
    wherein said mechanism to cause said downward force to said heat sink includes an elastic tab formed in an edge of said aperture,
    wherein said elastic tab abuts against a rib provided in said heat sink to cause said downward force.

7. The mechanism according to claim 6,
    wherein said elastic tab has an arched cross section.

8. A pluggable optical transceiver to be set in a cage with a heat sink to dissipate heat from said optical transceiver through a thermo-conducting sheet, said heat sink being applied with a downward force from said cage when said cage is free from said transceiver and providing a first rail with a first pocket and a second rail with a second pocket, said optical transceiver comprising:
    a first projection provided in a surface to come in contact with said thermo-conducting sheet; and
    a second projection provided in said surface, said second projection being not overlapped with said first projection in a direction along which said optical transceiver is inserted into said cage,
    wherein said first projection of said optical transceiver first runs on said first rail of said heat sink to lift said heat sink upward when said transceiver is inserted into said cage, and
    wherein said first projection is set within said first pocket and said second projection is set within said second pocket such that said heat sink comes in contact to said surface of said transceiver as putting said thermo-conducting sheet therebetween when said transceiver is set in a regular position within said cage.

9. The pluggable optical transceiver according to claim 8,
    wherein said thermo-conducting sheet is provided in said heat sink, and
    wherein said first projection and said second projection are apart from said thermo-conducting sheet.

10. The pluggable optical transceiver according to claim 8,
    wherein said first projection and said second projection each provides slopes in respective edges along a direction along which said optical transceiver is inserted into said cage.

11. A cage assembly for a pluggable optical transceiver, comprising:
    a cage configured to receive said pluggable optical transceiver, said cage providing an aperture in a top thereof and an elastic member; and
    a heat sink provided with a thermo-conducting sheet, said heat sink being exposed in said cage from said aperture and being vertically movable within said aperture by a downward force caused by said elastic member of said cage but substantially unable to move horizontally, said heat sink providing a rail with a pocket in a surface where said thermo-conducting sheet is attached thereto,
    wherein said optical transceiver provides a projection that runs on said rail to lift said heat sink upward against said downward force when said optical transceiver is inserted into said cage, and
    wherein said pocket receives said projection of said optical transceiver to have said thermo-conducting sheet come in contact to said optical transceiver when said transceiver is set in a regular position within said cage.

12. The cage assembly according to claim 11,
    wherein said heat sink has a slope between said rail and said pocket.

13. The cage assembly according to claim 11,
    wherein said cage provides an elastic tab in an edge of said aperture, and said heat sink provides a side rib,
    wherein said elastic tab abuts against a top surface of said side rib of said heat sink to cause said downward force to said heat sink.

14. The cage assembly according to claim 13,
    wherein said elastic tab includes a plurality of tabs each having an arched cross section, each of said tabs being formed by cutting said edge of said aperture with a preset interval and bending cut portions inward.

15. The cage assembly according to claim 11,
    wherein said cage provides a stopper within said aperture to receive said downward force when said cage is free from said optical transceiver.

16. The cage assembly according to claim 15,
    wherein said stopper is formed by bending an edge of said aperture downward and extending a tip of said bent edge longitudinally so as to receive a bottom corner of said heat sink.

* * * * *